Feb. 4, 1936.  J. J. KISPERT  2,029,875
CLASP AND HOOK STAY
Filed April 30, 1935
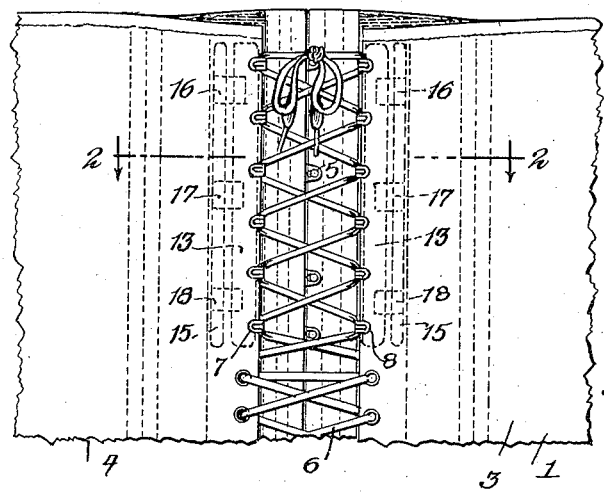
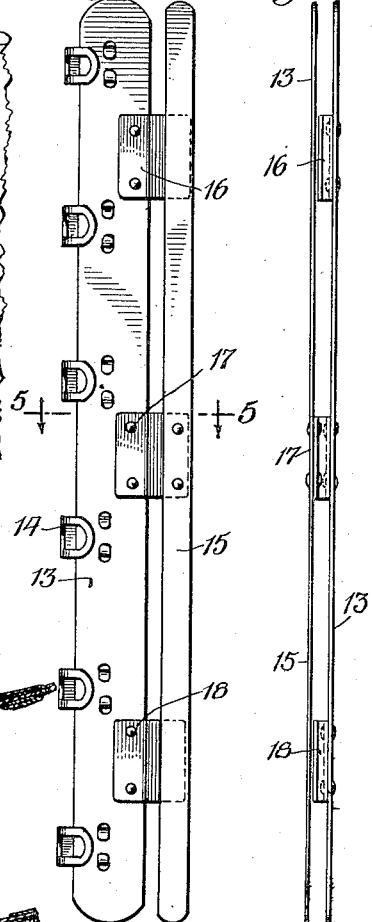
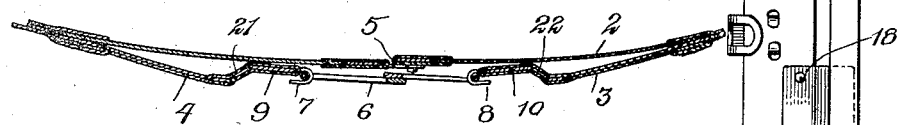
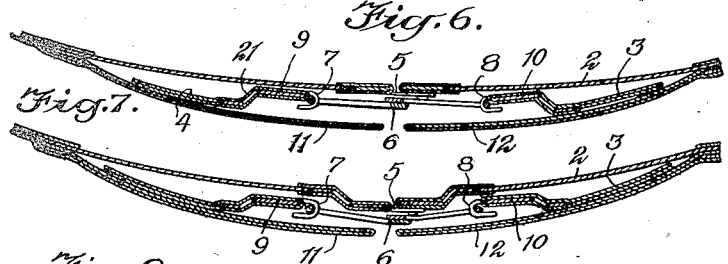
INVENTOR
Joseph J. Kispert
BY
Murray, Anderson & Liddy
ATTORNEYS
WITNESSES Patented Feb. 4, 1936

2,029,875

UNITED STATES PATENT OFFICE 2,029,875

CLASP AND HOOK STAY

Joseph J. Kispert, Hamden, Conn., assignor to I. Newman & Sons, Inc., New Haven, Conn., a corporation of Connecticut Application April 30, 1935, Serial No. 19,090

3 Claims. (Cl. 2—36)

This invention relates to an improved stay for hooks or clasps used on corsets, girdles, or other foundation garments, an object being to provide a construction wherein the stay may be properly supported and connected to the corset body without causing any noticeable projection.

Another object of the invention is to provide a construction of stay whereby the hooks or clasps of a corset are offset inwardly from the adjacent parts and, consequently, when a garment is placed thereover the hooks or clasps will not be noticeable.

A further object more specifically is to provide a stay wherein there is formed a hook or clasp supporting bar and an offset bar either integral with the hook or clasp or formed separate and spaced therefrom a short distance.

In the accompanying drawing—

Figure 1 is a fragmentary front view showing part of a corset with a stay embodying the invention applied thereto;

Fig. 2 is a sectional view through Fig. 1 approximately on the line 2—2, the same being on an enlarged scale;

Fig. 3 is an enlarged elevation of the stay and hooks shown in Fig. 2;

Fig. 4 is an edge view of the structure shown in Fig. 3;

Fig. 5 is a sectional view through Fig. 3 approximately on the line 5—5;

Fig. 6 is a view similar to Fig. 2 but showing a modified arrangement of corset wherein there are provided overlapping flaps;

Fig. 7 is a view similar to Fig. 6 except that the clasps are mounted upon a stay bar constructed substantially as shown in Fig. 3;

Fig. 8 is a perspective view of a modified form of stay bar;

Fig. 9 is a view similar to Fig. 5, but showing another modified form;

Fig. 10 is a view also similar to Fig. 5 but showing a further modified form;

Fig. 11 is a view similar to Fig. 9 but showing the offset bar in a different position.

Referring to the accompanying drawing by numerals, 1 indicates a corset body which is provided with a vest 2 and forward extensions 3 and 4. The vest 2 is connected by suitable clasps 5, while the forward extensions 3 and 4 are drawn toward each other by lacing 6 coacting with the respective hooks 7 and 8 carried by the stays 9 and 10. The construction just described is old and well known except the stays 9 and 10 which are shown in detail in Figs. 3 to 5, inclusive. When using ordinary stays instead of the stays 9 and 10 as shown in Fig. 2, the hooks 7 and 8 will protrude outwardly to a certain extent and where thin garments are worn over the corset this is more or less objectionable as the hooks will be seen either directly or by reason of their protuberance. In the present invention the stays shown in Figs. 3 to 5, inclusive, are intended to offset the hooks inwardly so that the hooks will not press against the dress or other garment fitted over the corset. Under some circumstances the arrangement shown in Fig. 6 where they are provided front flaps 11 and 12 which extend over and cover the hooks and all or most of the lacing portion is desirable. In the structures shown in Fig. 2 and Fig. 6 the stays are the same and present an offset arrangement. In Fig. 8 the same idea is present except that the stays 9 and 10 are used in connection with the clasps 5 to produce an inward offset of certain parts.

As shown in Figs. 3 and 4, there is provided a hook bar 13 having suitable hooks 14 connected thereto in any desired manner and spaced along the bar 13. The bar 13 is preferably flexible and may be made from flexible tempered steel which may be enameled or otherwise covered to prevent rust. Arranged parallel to but offset from the bar 13 is an offset bar 15 formed preferably of the same material as bar 13. Angle plates 16, 17 and 18 are riveted or otherwise rigidly secured to bar 13 and are each provided with a connecting portion 19 merging into the offset portion 20 as illustrated in Fig. 5. Rivets or other means are used to secure the center part of the bar 15 to the center plate 17, while the respective end portions of the bar 15 loosely engage the offsets 20 of the plates 16 and 18, or may be slightly spaced therefrom when not in use as illustrated in Fig. 4. The idea of not connecting the bar 15 nor the respective ends of plates 16 and 18 is to permit a full flexing action of the entire stay structure so that a person wearing a corset provided with one of these structures may freely bend without injuring any part of the corset. Under some circumstances, however, the modified form shown in Fig. 8 may be used wherein the bar 13' is integral with the connecting portion 19' and the offset portion 20. This presents a comparatively stiff construction which is desirable for certain types of corsets. However, the flexible structure shown in Figs. 3 and 4 is preferable as it provides a proper support at the front of the corset and also permits free flexing of the parts, while, at the same time, affording proper connections or supports for the hooks or clasps as the case may be. The respective stays 9 and 10 ar each preferably arranged in a single pocket 21 or 22 as the case may be. The same is true when the stays are used with the clasps 5.

The corset body 1 is made in any desired manner and of any of the desired published structures, except that the respective pockets 21 and 22 are made of a width whereby the entire stays may be positioned therein with the respective hooks 14 extending through the fabric as illustrated in Figs. 1 and 2.

In Fig. 9 a construction is disclosed which is similar to Fig. 5 except that instead of having an inclined section 19 connecting the bar 13 and bar 15, there is provided a right angle connection 21 which results in placing the offset bar 15 near the edge 22 of the bar 13.

In Fig. 10 a further modified form is shown wherein there is provided a hook-shaped connection 23 which offsets the bar 15 to about the same extent as the structure shown in Fig. 9, but by reason of the connection 23 a tilting action is largely prevented. However, in Fig. 11 the right angle connecting member 24 holds the bar 15 beneath the rear portion 25 of plate or bar 13. In this form of the invention the bar 13 is wider than in the other forms of the invention and the offset bar 15 is merely spaced from the rear edge portion of the bar 13.

I claim:

1. A stay for front laced corsets, comprising a hook bar having a plurality of hooks connected therewith, a plurality of plates connected to said bar and extending from one edge thereof, each of said plates having an offset portion, and a flexible offset bar having the center part connected with the center of said plates and the end portions positioned to rest against said offset portions when the stay is in use.

2. A stay for front laced corsets, comprising a hook bar having a plurality of hooks connected therewith, a plurality of plates connected to said bar extending from one edge thereof, each of said plates having an offset portion, and a flexible offset bar connected with one of said plates positioned to rest against the offset portion of each of said plates when the stay is in use.

3. A corset stay, comprising a flexible bar, hooks secured to said bar along one edge with portions offset from the front surface of said bar, a secondary flexible bar positioned parallel to the first-mentioned bar, and means connecting said bars so that the secondary bar will be offset from the front surface of the first-mentioned bar an equal or greater distance than said hooks, said connecting means acting to connect said bars without disturbing the flexibility of either of the bars.

JOSEPH J. KISPERT.